(12) United States Patent
Tang

(10) Patent No.: US 10,452,087 B2
(45) Date of Patent: Oct. 22, 2019

(54) LOW DROP-OUT REGULATOR

(71) Applicant: Wuhan Xinxin Semiconductor Manufacturing Co., Ltd., Wuhan, Hubei (CN)

(72) Inventor: Yuan Tang, San Jose, CA (US)

(73) Assignee: WUHAN XINXIN SEMICONDUCTOR MANUFACTURING CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/210,936

(22) Filed: Dec. 5, 2018

(65) Prior Publication Data

US 2019/0235546 A1 Aug. 1, 2019

(30) Foreign Application Priority Data

Jan. 26, 2018 (CN) .......................... 2018 1 0078019

(51) Int. Cl.
*G05F 1/575* (2006.01)
*H02M 3/07* (2006.01)
*G05F 1/46* (2006.01)

(52) U.S. Cl.
CPC .............. *G05F 1/575* (2013.01); *G05F 1/468* (2013.01); *H02M 3/07* (2013.01)

(58) Field of Classification Search
CPC .......... G05F 1/575; G05F 1/468; G05F 1/461; G05F 1/56; G05F 1/59; G05F 1/62; H02M 3/07

USPC ................ 323/273, 274, 275, 280, 281, 303
See application file for complete search history.

(56) References Cited

U.S. PATENT DOCUMENTS

2019/0013784 A1* 1/2019 Li ....................... H03F 3/45179

FOREIGN PATENT DOCUMENTS

CN          101615046 A     6/2015
CN          104699162 A     6/2015

* cited by examiner

*Primary Examiner* — Alex Torres-Rivera
(74) *Attorney, Agent, or Firm* — Muncy, Geissler, Olds & Lowe, P.C.

(57) ABSTRACT

A low drop-out (LDO) regulator including a first operational amplifier, a first transistor, a second transistor, a voltage feedback circuit and a charge pump is disclosed. Each of the first transistor and the second transistor is coupled between supply voltage and an output voltage. The first operational amplifier outputs a first gate-controlled voltage to turn the first transistor on or off. A second gate-controlled voltage is provided to the second transistor to turn it on or off. The charge pump makes the second gate-controlled voltage equal to the sum of the output voltage, a threshold voltage of the second transistor and a drive voltage of the second transistor. The voltage feedback circuit provides a feedback voltage to the first operational amplifier. The first gate-controlled voltage is positively correlated to the feedback voltage. The first transistor is a P-channel field effect transistor; the second transistor is an N-channel field effect transistor.

15 Claims, 3 Drawing Sheets

LOW DROP-OUT REGULATOR

CROSS-REFERENCE TO RELATED APPLICATION

This application claims the priority of Chinese patent application number 201810078019.6, filed on Jan. 26, 2018, the entire contents of which are incorporated herein by reference.

TECHNICAL FIELD

The present invention relates to the field of semiconductor technology and, in particular, to a low drop-out (LDO) regulator.

BACKGROUND

Normal operation of conventional linear voltage regulators, such as those of the 78XX series, requires an input voltage that is at least 2-3 V higher than the output voltage. For some power supplies, this requirement is too harsh. For example, a 5 V power supply could not be converted to 3.3V by using a conventional linear regulator because a voltage difference between the input and output is only 1.7V, which does not meet the aforesaid requirement.

To this end, low drop-out (LDO) voltage converters have been developed. An LDO converter is a linear voltage regulator that employs a transistor or field effect transistor (FET) operating in its linear region and can remove an excess voltage from the input voltage so as to generate a regulated output voltage. LDO regulators have a range of outstanding advantages over conventional linear voltage regulators, such as lower costs, lower noises and lower quiescent currents. These advantages are essentially offered by P-channel MOSFETs employed in the LDO linear voltage regulators, compared to PNP transistors in the conventional linear voltage regulators. As P-channel MOSFETs are voltage-driven devices without the need for currents, the current consumption in LDO regulators are much lower. In addition, the use of a PNP transistor requires a voltage drop between the input and output voltages that is not lower than a certain value in order to prevent saturation of the PNP transistor which is detrimental to the output capabilities. In contrast, a voltage drop across a P-channel MOSFET is roughly equal to the product of the output current and the on-resistance. As most MOSFETs are low in on-resistance, voltage drops across them are often very low. However, as a drive voltage for a P-channel MOSFET is equal to its gate-source voltage minus the threshold voltage, i.e., the supply voltage minus the threshold voltage, when driving a PMOS with a low supply voltage, it requires the PMOS to have a large size so as to have a low threshold voltage.

SUMMARY OF THE INVENTION

It is an object of the present invention to provide a low drop-out (LDO) regulator that is reduced in size compared to existing LDO regulators.

To this end, the present invention provides an LDO regulator, comprising a first operational amplifier, a first transistor, a second transistor, a voltage feedback circuit and a charge pump.

Each of the first transistor and the second transistor is coupled between a supply voltage and an output voltage, and the first operational amplifier outputs a first gate-controlled voltage to turn on or turn off the first transistor.

A second gate-controlled voltage is provided to turn it on or off, and the charge pump keeps the second gate-controlled voltage equal to a sum of the output voltage, a threshold voltage of the second transistor and a drive voltage of the second transistor.

The voltage feedback circuit provides a feedback voltage to the first operational amplifier, and the first gate-controlled voltage is positively correlated to the feedback voltage.

The first transistor is a P-channel field effect transistor, and the second transistor is an N-channel field effect transistor.

Optionally, in the LDO regulator, the first operational amplifier may have an inverting input supplied with a first reference voltage and a non-inverting input supplied with the feedback voltage.

Optionally, in the LDO regulator, the first transistor may have a gate connected to an output of the first operational amplifier, a source supplied with the supply voltage and a drain connected to the voltage feedback circuit and coupled to the output voltage; wherein the second transistor has a gate supplied with the second gate-controlled voltage, a drain supplied with the supply voltage and a source connected to the voltage feedback circuit and coupled to the output voltage.

Optionally, in the LDO regulator, the voltage feedback circuit may comprise a first resistor and a second resistor, the first resistor connected to the drain of the first transistor and the source of the second transistor and coupled to the output voltage at one end, and connected to the non-inverting input of the first operational amplifier at the other end; the second resistor grounded at one end and connected to the non-inverting input of the first operational amplifier at the other end.

Optionally, in the LDO regulator, the charge pump may have a first input supplied with the supply voltage and a second input supplied with the second reference voltage and output a charge pump voltage that is proportional to the second reference voltage.

Optionally, the LDO regulator may further comprise a first voltage converter having a power supply terminal supplied with the charge pump voltage and an output that outputs the second gate-controlled voltage, wherein when the first voltage converter is switched on, the second gate-controlled voltage is equal to the charge pump voltage, and wherein when the first voltage converter is switched off, the second gate-controlled voltage is equal to zero.

Optionally, in the LDO regulator, the charge pump voltage may be lower than an oxide breakdown voltage of the second transistor.

Optionally, the LDO regulator may further comprise a second operational amplifier, having an inverting input supplied with the first gate-controlled voltage or the supply voltage, a non-inverting input supplied with a third reference voltage, and an output connected to a first control terminal of the first voltage converter.

Optionally, in the LDO regulator, when the first gate-controlled voltage or the supply voltage is lower than the third reference voltage, the second operational amplifier may output a first control signal to activate the first voltage converter.

Optionally, the LDO regulator may further comprise a third operational amplifier, having an inverting input supplied with a fourth reference voltage, a non-inverting input supplied with the feedback voltage, and an output connected to a second control terminal of the first voltage converter, wherein when the feedback voltage is higher than the fourth reference voltage, the third operational amplifier outputs a second control signal to deactivate the first voltage converter.

Optionally, in the LDO regulator, the third reference voltage may be equal to the output voltage minus a threshold voltage of the first transistor or proportional to a nominal value of the supply voltage; wherein the fourth reference voltage is higher than Vout×R1/(R1+R2), where R1 represents a resistance value of the first resistor, R2 represents a resistance value of the second resistor and Vout is the output voltage.

Optionally, the LDO regulator may further comprise: a third transistor, wherein the third transistor is coupled between the supply voltage and the output voltage and is implemented as an N-channel field effect transistor; and wherein a fourth operational amplifier outputs a third gate-controlled voltage to turn on or turn off the third transistor.

Optionally, in the LDO regulator, the fourth operational amplifier may have a non-inverting input supplied with a fifth reference voltage, an inverting input supplied with the feedback voltage, and an output coupled to a gate of the third transistor, wherein the third transistor has a drain coupled to the supply voltage and a source coupled to the output voltage.

Optionally, the LDO regulator may further comprise a second voltage converter and a pulse generator, wherein:

the output of the fourth operational amplifier is connected to the pulse generator; the pulse generator is connected to a first control terminal of the second voltage converter; an output of the second voltage converter is connected to the gate of the third transistor; a power supply terminal of the second voltage converter is supplied with the charge pump voltage; the output of the second voltage converter outputs the third gate-controlled voltage; when the second voltage converter is activated, the third gate-controlled voltage is equal to the charge pump voltage; when the second voltage converter is deactivated, the third gate-controlled voltage is equal to zero;

and when the feedback voltage is lower than the fifth reference voltage, the fourth operational amplifier outputs a third control signal causing the pulse generator to output a pulse to activate the second voltage converter.

In the LDO regulator of the present invention, as the first transistor is a P-channel field effect transistor, when the supply voltage decreases, the drive voltage of the first transistor (corresponding to drivability of the first transistor and being equal to the gate-source voltage of the first transistor minus the threshold voltage there the first transistor, i.e., the supply voltage minus the threshold voltage of the first transistor) decreases as well, decreasing both the conductance of the first transistor and the output voltage. As the same time, as the second transistor is an N-channel field effect transistor and since the second gate-controlled voltage provided there the second transistor is maintained constant, the drive voltage of the second transistor (corresponding to drivability of the second transistor and being equal to the gate-source voltage of the second transistor minus the threshold voltage there the second transistor i.e., the second gate-controlled voltage minus the sum of the output voltage and the threshold voltage of the second transistor) increases by an amount that is equal to the decrease in the output voltage. As a result, the conductance of the second transistor increases, causing an increase in the output voltage which cancels out the decrease there the output voltage. Thus, the output voltage can be more stabilized without needing to expand the size of the first transistor.

In the figures: 10, a charge pump; 20, a first voltage converter; 30, a pulse generator and 40, a second voltage converter.

DETAILED DESCRIPTION

The LDO regulator proposed in this invention will be described below in further detail with reference to the accompanying drawings and some specific embodiments. Features and advantages of the invention will be more apparent from the following detailed description, and from the appended claims. It is noted that the figures are provided in a very simplified form not necessarily presented to scale, with the only intention to facilitate convenience and clarity in explaining the disclosed embodiments.

The core concept of the present invention is to provide a low drop-out (LDO) regulator that is reduced in size compared to existing LDO regulators.

To this end, the invention provides an LDO regulator, comprising a first operational amplifier, a first transistor, a second transistor, a voltage feedback circuit and a charge pump. Each of the first transistor and the second transistor is coupled between a supply voltage and an output voltage. The first operational amplifier outputs a first gate-controlled voltage to turn the first transistor on or off. A second gate-controlled voltage is provided to the second transistor to turn it on or off. The charge pump makes the second gate-controlled voltage equal to the sum of the output voltage, a threshold voltage of the second transistor and a drive voltage of the second transistor. The voltage feedback circuit provides a feedback voltage to the first operational amplifier. The first gate-controlled voltage is positively correlated to the feedback voltage. The first transistor is a P-channel field effect transistor, and the second transistor is an N-channel field effect transistor.

Figure 1:
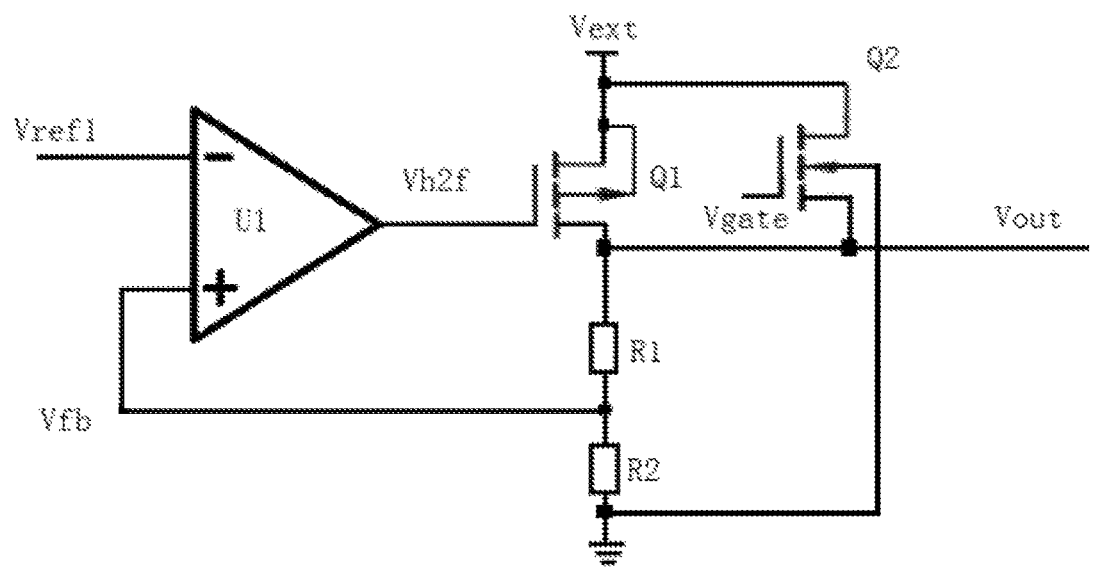
FIG. 1 schematically illustrates an LDO regulator according to an embodiment of the present invention.

In the embodiment illustrated in FIG. 1, the LDO regulator includes a first operational amplifier U1, a first transistor Q1, a second transistor Q2, a voltage feedback circuit and a charge pump 10. Each of the first transistor Q1 and the second transistor Q2 is coupled between a supply voltage Vext and an output voltage Vout. The first operational amplifier U1 outputs a first gate-controlled voltage Vh2f to turn the first transistor Q1 on or off. A second gate-controlled voltage Vgate1 is provided to the second transistor Q2 to turn it on or off, and the second gate-controlled voltage Vgate1 is kept constant. The charge pump 10 makes the second gate-controlled voltage equal to the sum of the output voltage, a threshold voltage of the second transistor and a drive voltage of the second transistor. The voltage feedback circuit provides the first operational amplifier U1 with a feedback voltage Vfb which enables the first operational amplifier U1 to regulate the first gate-controlled voltage Vh2f so as to keep the first gate-controlled voltage Vh2f positively correlating to the feedback voltage Vfb. The first transistor Q1 is a P-channel field effect transistor, and the second transistor Q2 is an N-channel field effect transistor.

In the LDO regulator according to this embodiment, as the first and second transistors are implemented as P- and N-channel field effect transistors, respectively, the drive voltage of the first transistor Q1 is positively correlated to the supply voltage Vext, while the drive voltage of the second transistor Q2 is negatively correlated to the supply voltage Vext. Specifically, when the supply voltage Vext decreases, the drive voltage of the first transistor Q1 (corresponding to drivability of the first transistor Q1 and being equal to the gate-source voltage of the first transistor Q1 minus the threshold voltage thereof, i.e., the supply voltage Vext minus the threshold voltage of the first transistor Q1, i.e., Voverdrive1=Vsg1−Vth1=Vext−Vh2$f$−Vth1=Vext−Vth1) decreases as well, lowering both the conductance of the first transistor and the output voltage. As the same time, as the second transistor is an N-channel field effect transistor and since the second gate-controlled voltage provided thereto is maintained constant, the drive voltage of the second transistor Q2 (corresponding to drivability of the second transistor Q2 and being equal to the gate-source voltage of the second transistor Q2 minus the threshold voltage thereof, i.e., the second gate-controlled voltage minus the sum of the output voltage Vout and the threshold voltage of the second transistor Q2, i.e, Voverdrive2=Vsg2−Vth2=Vgate1−Vout−Vth2) increases, raising the conductance of the second transistor and the output voltage. Moreover, the increase in the drive voltage Voverdrive2 of the second transistor Q2 is equal to, and cancels out, the decrease in the drive voltage Voverdrive1 of the first transistor Q1. As a result, a balanced drivability is achieved. Since the increase and decrease in the output voltage are canceled out, the output voltage can be more stabilized without needing to expand the size of the first transistor. In the above equations, Vth1, the threshold voltage of the first transistor Q1; Vth2, the threshold voltage of the second transistor Q2; Voverdrive1, the drive voltage of the first transistor Q1; Voverdrive2, the drive voltage of the second transistor Q2; Vsg1, the gate-source voltage of the first transistor Q1; and Vsg2, the gate-source voltage of the second transistor Q2.

Specifically, in the LDO regulator, the first operational amplifier U1 may have an inverting input supplied with a first reference voltage Vref1 and a non-inverting input supplied with the feedback voltage Vfb. The first transistor has a gate connected to an output of the first operational amplifier U1 (i.e., coupled to the first gate-controlled voltage Vh2$f$), a source supplied with the supply voltage Vext and a drain connected to the voltage feedback circuit and coupled to the output voltage Vout. The second transistor Q2 may have a gate supplied with the second gate-controlled voltage Vgate1, a drain supplied with the supply voltage Vext and a source connected to the voltage feedback circuit and coupled to the output voltage Vout.

Additionally, in the LDO regulator, the voltage feedback circuit may include a first resistor R1 and a second resistor R2. The first resistor R1 may be connected to the drain of the first transistor Q1 and the source of the second transistor (i.e., coupled to the output voltage Vout) at one end and connected to the non-inverting input of the first operational amplifier U1 (i.e., coupled to the feedback voltage Vfb) at the other end. The second resistor R2 may be grounded at one end and connected to the non-inverting input of the first operational amplifier U1 (i.e., coupled to feedback voltage Vfb) at the other end. Moreover, in the LDO regulator, the second gate-controlled voltage may be equal to the sum of the output voltage, the threshold voltage of the second transistor and the drive voltage of the second transistor, i.e., $$Vgate1=Vout+Vth2+Voverdrive2.$$

Figure 2:
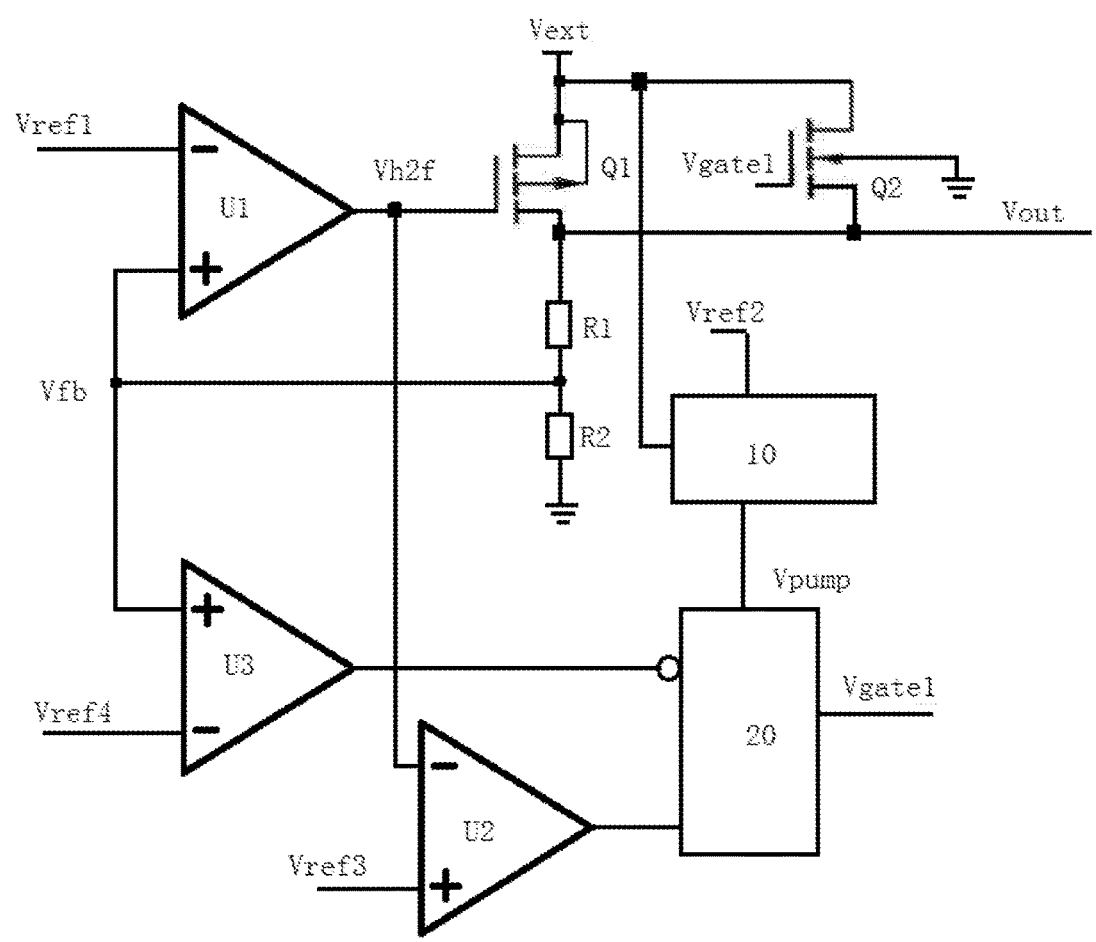
FIGS. 2 to 3 schematically illustrate LDO regulators according to other embodiments of the present invention.
Figure 3:
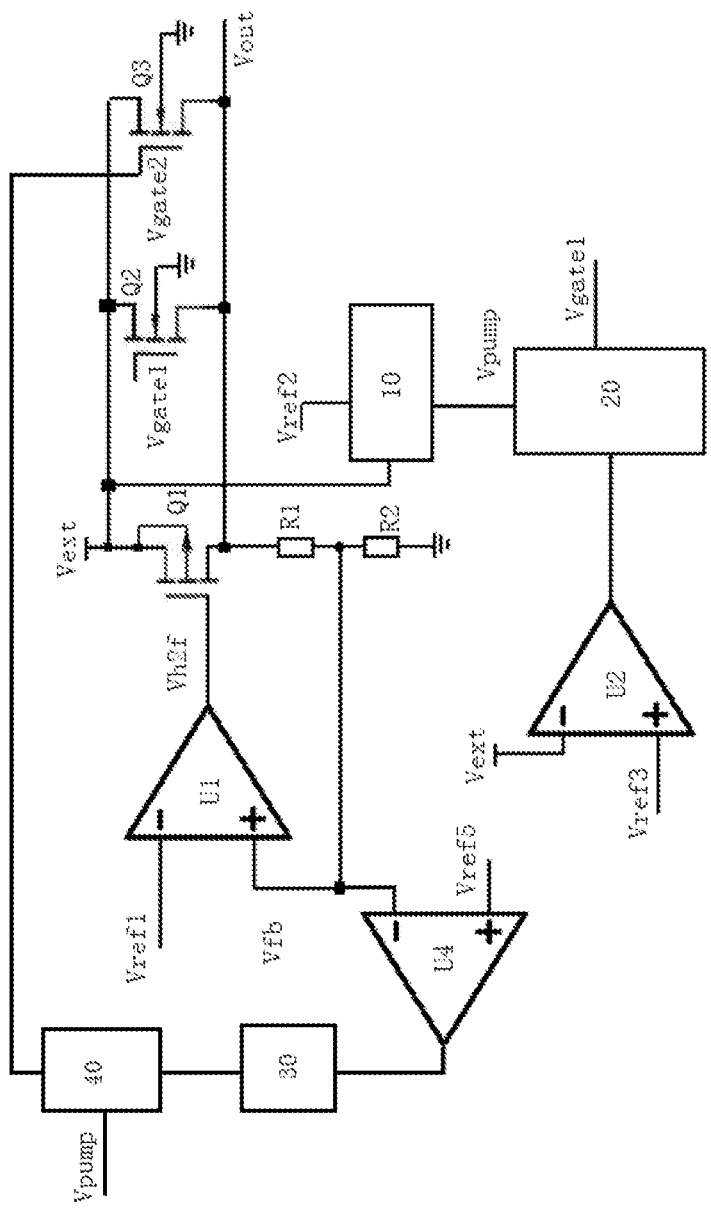

In an LDO regulator according to another embodiment, as shown in FIG. 2, a value of the second gate-controlled voltage of the LDO regulator is determined by the feedback voltage and the first gate-controlled voltage. The LDO regulator further comprises the charge pump 10 which has a first input supplied with the supply voltage Vext and a second input supplied with the second reference voltage Vref2 and outputs a charge pump voltage Vpump that is proportional to the second reference voltage Vref2. Preferably, the charge pump voltage is lower than an oxide breakdown voltage of the second transistor. Thus, the charge pump voltage Vpump is immune from fluctuations in the supply voltage Vext. The LDO regulator may further include a first voltage converter 20 having a power supply terminal supplied with the charge pump voltage Vpump and an output that outputs the second gate-controlled voltage Vgate1. When the first voltage converter 20 is switched on, the second gate-controlled voltage Vgate1 may be equal to the charge pump voltage Vpump (i.e., immune from fluctuations in the supply voltage Vext). Moreover, when the first voltage converter 20 is switched off, the second gate-controlled voltage Vgate1 may become zero.

Further, the LDO regulator may further include a second operational amplifier U2 having an inverting input supplied with the first gate-controlled voltage Vh2$f$, a non-inverting input supplied with a third reference voltage Vref3, and an output connected to a first control terminal of the first voltage converter 20. The LDO regulator may further include a third operational amplifier U3 having an inverting input supplied with a fourth reference voltage Vref4, a non-inverting input supplied with the feedback voltage Vfb, and an output connected to a second control terminal of the first voltage converter. When the first gate-controlled voltage Vh2$f$ is lower than the third reference voltage Vref3, the second operational amplifier U2 may output a first control signal Vgate1_1 to the first control terminal so as to activate the first voltage converter 20 (i.e., Vgate1 is equal to the logic "1"). When the feedback voltage Vfb is higher than the fourth reference voltage Vref4, the third operational amplifier U3 may output a second control signal Vgate1_2 to the second control terminal so as to deactivate the first voltage converter 20 (i.e., Vgate1 is equal to the logic "0"). However, the logic values "1" and "0" of Vgate1 do not represent the output of fixed digital voltages. Instead, analog voltage values are regulated and output depending upon the output voltages of the second and third operational amplifiers, so as to allow a gradient change in the conductance of the second transistor.

Further, in the LDO regulator, the third reference voltage Vref3 may be equal to the output voltage minus the threshold voltage of the first transistor Q1, i.e., Vref3=Vout−Vth1. The fourth reference voltage Vref4 may be higher than Vout×R1/(R1+R2), where R1 represents a resistance value of the first resistor R1, R2 denotes a resistance value of the second resistor R2 and Vout is the output voltage. In the LDO regulator, the charge pump voltage may be lower than the oxide breakdown voltage of the second transistor.

According to this embodiment, an additional NMOS transistor connecting the supply voltage Vext and the output voltage is introduced into the LDO regulator which has only one PMOS transistor. Since a gate-controlled voltage of the NMOS transistor is independent from the supply voltage, the PMOS transistor can be immunized from fluctuations in the supply voltage. Additionally, the drivability of the NMOS transistor is proportional to its gate biasing voltage Vgate1 (this voltage peaks sometimes at 0 and sometimes at Vpump, so the effective voltage value is related to the duty cycle) which is provided by the charge pump circuit acquiring electric charges from Vext. The maximum value of Vgate1 should not exceed the oxide breakdown voltage of the NMOS, and in order to switch the second transistor on and off in a reasonable way, Vgate1 should be provided with a feedback signal control related to the output voltage. Alternatively, Vgate1 may also be equal to (Vout+Vth2+Voverdrive2), so Voverdrive2=Vgate1−Vth2−Vout=Vgate1−Vth2−Vext. As a result, the NMOS may be reasonably turned on and off as long as Vext=Vout, and the output voltage terminal may be powered without needing to employ any additional feedback circuit.

To sum up, the value of Vgate1 can be taken from any of the following two ways: 1) a maximum value among values which do not exceed the oxide breakdown voltage of the NMOS. In this case, the value of Vgate1 can be easily determined, but it is necessary for Vgate1 to be controlled by a feedback voltage Vfb provided by a conventional LDO circuit. 2) Vgate1=Vout+Vth2+Voverdrive2. In this case, the output voltage terminal can be powered without needing to employ any additional feedback circuit. The voltage drop across the NMOS transistor is dependent on its gate voltage Vgate1 but is independent from Vext.

In another embodiment, the inverting input of the second operational amplifier U2 is supplied with the supply voltage Vext, and the third reference voltage Vref3 supplied to the non-inverting input of the second operational amplifier U2 is proportional to a nominal value of the supply voltage. For example, the third reference voltage Vref3 may be equal to 64% of the nominal value of the supply voltage. In this case, when the supply voltage Vext is lower than the third reference voltage Vref3, i.e., 64% of its nominal value (i.e., Vext is close to Vout, which is unfavorable to the accuracy and reliability of the output voltage Vout), the second operational amplifier U2 will output the first control signal to activate the first voltage converter 20 so that the first voltage converter 20 outputs the logic "1". As a result, the second gate-controlled voltage Vgate1 is equal to the charge pump voltage Vpump, and the second transistor Q2 is turned on. The LDO regulator may further comprise: a third transistor Q3 that is coupled between the supply voltage Vext and the output voltage Vout and is implemented as an N-channel field effect transistor. A fourth operational amplifier U4 outputs a third gate-controlled voltage Vgate2 to turn the third transistor Q3 on or off. The fourth operational amplifier U4 may have a non-inverting input supplied with a fifth reference voltage Vref5, an inverting input supplied with the feedback voltage Vfb, and an output coupled to a gate of the third transistor Q3. The third transistor Q3 may have a drain coupled to the supply voltage Vext and a source coupled to the output voltage Vout. With this arrangement, when the feedback voltage Vfb is lower than the fifth reference voltage Vref5, the fourth operational amplifier U4 will output a high level to turn the third transistor Q3 on, thereby even more stabilizing the output voltage Vout. The fifth reference voltage may be equal to Vout*R1/(R1+R2).

The LDO regulator may further comprise a second voltage converter 40 and a pulse generator 30, in which the output of the fourth operational amplifier U4 is connected to the pulse generator 30. The pulse generator 30 is connected to a first control terminal of the second voltage converter 40. An output of the second voltage converter 40 is connected to the gate of the third transistor Q3. A power supply terminal of the second voltage converter 40 is supplied with the charge pump voltage Vpump. The output of the second voltage converter 40 outputs the third gate-controlled voltage Vgate2. When the second voltage converter 40 is activated, the third gate-controlled voltage Vgate2 is equal to the charge pump voltage Vpump; when the second voltage converter 40 is deactivated, the third gate-controlled voltage Vgate2 is equal to zero; and when the feedback voltage Vfb is lower than the fifth reference voltage Vref5, the fourth operational amplifier U4 outputs a third control signal causing the pulse generator 30 to output a pulse which activates the second voltage converter 40.

The output voltage of the LDO regulator according to the present invention may be adjusted using an analog signal which is less affected by noise and vibration when compared to digital signals.

The LDO regulator according to the present invention comprises a feedback loop constituted by the first operational amplifier and the first transistor (P-channel field effect transistor) and a supporting circuit constituted by the charge pump, the second transistor (N-channel field effect transistor) and the second operational amplifier. The LDO regulator can operate to regulate an input supply voltage varying in a wide range into a constant output supply voltage. A feedback loop consisting of the charge pump and the second transistor (N-channel field effect transistor) makes up for the deficiency of the first transistor (P-channel field effect transistor) that its conductance decreases along with the decrease of the input supply voltage. Therefore, with the present invention, the output voltage can be adjusted to the lower limit of the input supply voltage (it will only be lower than the input voltage when the first transistor is relied on for providing the output voltage) and the footprint of the transistor on the chip can be significantly reduced.

In summary, various configurations of the LDO regulator have been detailed in the above embodiments. Of course, the present invention includes, but not limited to, the configurations disclosed above, and any and all modifications made to these configurations are considered to fall within the scope of the invention. Those skilled in the art can extend the inventive ideas in many ways.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A low drop-out (LDO) regulator, comprising a first operational amplifier, a first transistor, a second transistor, a voltage feedback circuit and a charge pump, wherein:
   each of the first transistor and the second transistor is coupled between a supply voltage and an output voltage; the first operational amplifier outputs a first gate-controlled voltage to turn on or turn off the first transistor;
   a second gate-controlled voltage is provided to the second transistor to turn on or turn off the second transistor; the charge pump keeps the second gate-controlled voltage equal to a sum of the output voltage, a threshold voltage of the second transistor and a drive voltage of the second transistor;
   the voltage feedback circuit provides a feedback voltage to the first operational amplifier;
   the first gate-controlled voltage is positively correlated to the feedback voltage;
   the first transistor is a P-channel field effect transistor; and the second transistor is an N-channel field effect transistor.

2. The LDO regulator of claim 1, wherein the first operational amplifier has an inverting input supplied with a first reference voltage and a non-inverting input supplied with the feedback voltage.

3. The LDO regulator of claim 2, wherein the first transistor has a gate connected to an output of the first operational amplifier, a source supplied with the supply voltage and a drain connected to the voltage feedback circuit and coupled to the output voltage; and wherein the second transistor has a gate supplied with the second gate-controlled voltage, a drain supplied with the supply voltage and a source connected to the voltage feedback circuit and coupled to the output voltage.

4. The LDO regulator of claim 3, wherein the voltage feedback circuit comprises a first resistor and a second resistor, the first resistor connected to the drain of the first transistor and the source of the second transistor as well as coupled to the output voltage at one end, and connected to the non-inverting input of the first operational amplifier at the other end; and wherein the second resistor is grounded at one end and connected to the non-inverting input of the first operational amplifier at the other end.

5. The LDO regulator of claim 1, wherein the charge pump has a first input supplied with the supply voltage and a second input supplied with a second reference voltage and outputs a charge pump voltage that is proportional to the second reference voltage.

6. The LDO regulator of claim 5, further comprising a first voltage converter, wherein the first voltage converter has a power supply terminal supplied with the charge pump voltage and an output that outputs the second gate-controlled voltage, wherein when the first voltage converter is switched on, the second gate-controlled voltage is equal to the charge pump voltage, and wherein when the first voltage converter is switched off, the second gate-controlled voltage is equal to zero.

7. The LDO regulator of claim 6, wherein the charge pump voltage is lower than an oxide breakdown voltage of the second transistor.

8. The LDO regulator of claim 6, further comprising a second operational amplifier having an inverting input supplied with the first gate-controlled voltage or the supply voltage, a non-inverting input supplied with a third reference voltage, and an output connected to a first control terminal of the first voltage converter.

9. The LDO regulator of claim 8, wherein when the first gate-controlled voltage or the supply voltage is lower than the third reference voltage, the second operational amplifier outputs a first control signal to activate the first voltage converter.

10. The LDO regulator of claim 8, further comprising a third operational amplifier having an inverting input supplied with a fourth reference voltage, a non-inverting input supplied with the feedback voltage, and an output connected to a second control terminal of the first voltage converter, wherein when the feedback voltage is higher than the fourth reference voltage, the third operational amplifier outputs a second control signal to deactivate the first voltage converter.

11. The LDO regulator of claim 8, wherein the third reference voltage is equal to the output voltage minus a threshold voltage of the first transistor or is proportional to a nominal value of the supply voltage.

12. The LDO regulator of claim 10, wherein the fourth reference voltage is higher than Vout×R1/(R1+R2), where R1 represents a resistance value of the first resistor, R2 represents a resistance value of the second resistor and Vout is the output voltage.

13. The LDO regulator of claim 8, further comprising: a third transistor that is coupled between the supply voltage and the output voltage and is implemented as an N-channel field effect transistor; and a fourth operational amplifier which outputs a third gate-controlled voltage to turn on or turn off the third transistor.

14. The LDO regulator of claim 13, wherein the fourth operational amplifier has a non-inverting input supplied with a fifth reference voltage, an inverting input supplied with the feedback voltage, and an output coupled to a gate of the third transistor, and wherein the third transistor has a drain coupled to the supply voltage and a source coupled to the output voltage.

15. The LDO regulator of claim 14, further comprising a second voltage converter and a pulse generator, wherein:
the output of the fourth operational amplifier is connected to the pulse generator; the pulse generator is connected to a first control terminal of the second voltage converter; an output of the second voltage converter is connected to the gate of the third transistor; a power supply terminal of the second voltage converter is supplied with the charge pump voltage; the output of the second voltage converter outputs the third gate-controlled voltage; when the second voltage converter is activated, the third gate-controlled voltage is equal to the charge pump voltage; when the second voltage converter is deactivated, the third gate-controlled voltage is equal to zero;
and when the feedback voltage is lower than the fifth reference voltage, the fourth operational amplifier outputs a third control signal causing the pulse generator to output a pulse to activate the second voltage converter.

* * * * *